(12) United States Patent
Gidcumb, Jr. et al.

(10) Patent No.: US 7,367,602 B1
(45) Date of Patent: May 6, 2008

(54) STORAGE BIN ASSEMBLY

(75) Inventors: Daniel B. Gidcumb, Jr., Canton, MI (US); Lauren M. Abro, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/770,311

(22) Filed: Jun. 28, 2007

(51) Int. Cl.
*B60R 7/04* (2006.01)

(52) U.S. Cl. .................................. 296/24.34; 296/37.8

(58) Field of Classification Search ............. 296/24.34, 296/37.8, 37.1, 37.14; 224/539, 545, 547
See application file for complete search history.

(56) References Cited

U.S. PATENT DOCUMENTS

| | | | |
|---|---|---|---|
| 1,820,064 A | 8/1931 | Green | |
| 2,140,628 A | 12/1938 | Hoff | |
| 2,864,647 A | 12/1958 | Chesna et al. | |
| 4,316,675 A | 2/1982 | Melicque et al. | |
| 4,875,816 A | 10/1989 | Peterson | |
| 5,193,643 A | 3/1993 | McIntyre | |
| 5,558,369 A | 9/1996 | Cornea et al. | |
| 6,146,071 A | 11/2000 | Norkus et al. | |
| 7,163,259 B2 | 1/2007 | Hayashi et al. | |
| 7,222,906 B2 * | 5/2007 | Sakakibara et al. | 296/24.34 |
| 2005/0134069 A1 | 6/2005 | Odulio et al. | |

* cited by examiner

*Primary Examiner*—Joseph D Pape
(74) *Attorney, Agent, or Firm*—Gifford, Krass, Sprinkle, Anderson & Citkowski, P.C.

(57) ABSTRACT

A bin assembly for use in an interior passenger compartment of a motor vehicle. The bin assembly includes a nut, a bin and a bracket for fixedly securing the bin assembly to the motor vehicle. The bracket includes a hole extending therethrough. The bin has an end wall with opposite first and second sides. The bin has a side wall extending outwardly from the first side of the end wall to form a storage space. A flange wall extends outwardly from the second side of the end wall. Retaining walls extend outwardly from the flange wall to form an open-ended box section for receiving and locating the nut therein along generally orthogonal first and second axes.

14 Claims, 2 Drawing Sheets

STORAGE BIN ASSEMBLY

FIELD OF THE INVENTION

The invention relates to a bin assembly for use in an interior passenger compartment of an automotive vehicle. More particularly, the invention relates to a bin and a bracket of the bin assembly and the structure for interconnecting the bin and the bracket together.

BACKGROUND OF THE INVENTION

Motor vehicles typically have storage bins for storing miscellaneous objects, such as coins, keys, compact discs and the like. It remains desirable to provide an improved storage bin design that is easier to manufacture and more aesthetically pleasing over conventional bins designs.

SUMMARY OF THE INVENTION

According to one aspect of the invention, a bin assembly is provided for use in an interior passenger compartment of a motor vehicle. The bin assembly includes a bin and a bracket for fixedly securing the bin assembly to the motor vehicle. The bracket includes a hole extending therethrough. The bin has an end wall with opposite first and second sides. The bin has a side wall extending outwardly from the first side of the end wall to form a storage space. A flange wall extends outwardly from the second side of the end wall. A first retaining wall extends from the flange wall. A second retaining wall extends from the flange wall and has a hole aligned with the hole in the bracket to receive a fastener therethrough. The first and second retaining walls are generally parallel and spaced apart to retain a nut therebetween, such that the nut is presented for threading onto the fastener extending through the holes in the bracket and the second retaining wall of the bin.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
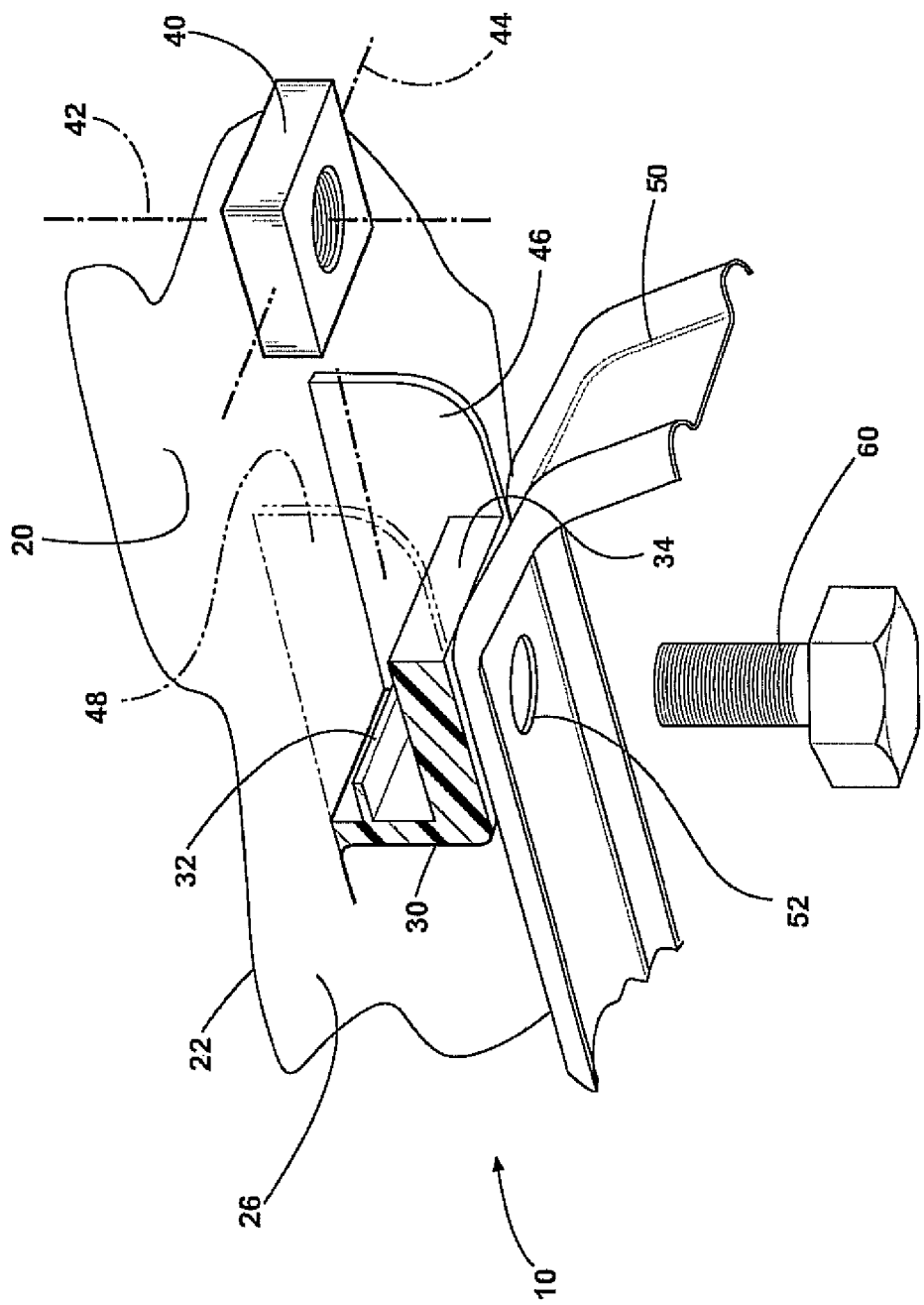
FIG. 1 is a bottom perspective view of a portion of a bin assembly according to one aspect of the invention.
Figure 2:
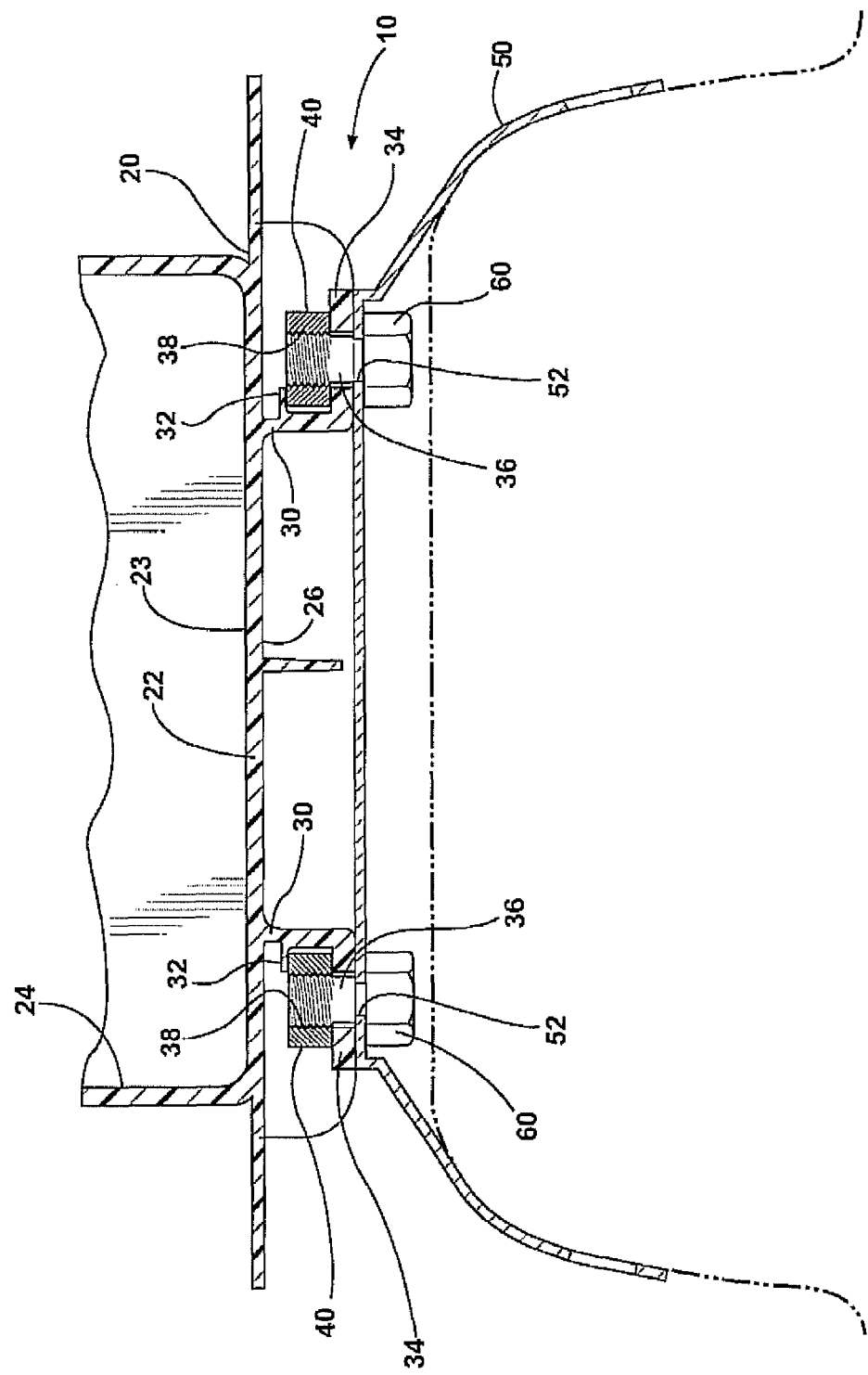
FIG. 2 is a cross sectional view of a bin assembly according to one embodiment of the invention.

Referring to the FIGS. 1 and 2, a bin assembly according to one embodiment of the invention is generally indicated at 10. The bin assembly 10 includes a bin 20 and a bracket 50. The bin 20 is formed from resin or any suitable moldable material using any molding process known by those having ordinary skill in the art. The bin 20 includes an end wall 22 having opposite first 23 and second 26 sides. A side wall 24 extends outwardly from a first side 23 of the end wall 22 to form a storage space.

The bin 20 includes a flange wall 30 extending outwardly from the second side 26 of the end wall 22 opposite the first side 23. A first retaining wall 32 extends from the flange wall 30. The first retaining wall 32 is generally parallel to and spaced apart from the end wall 22. A second retaining wall 34 extends from the flange wall 30. The second retaining wall 34 is generally parallel to and spaced apart from the first retaining wall 32 to locate and retain a nut 40 therebetween along a first axis 42, which is shown illustratively as the longitudinal axis of the threaded bore extending through the nut 40.

The bin 20 also includes third 46 and fourth 48 retaining walls extending outwardly from the second side 26 of the end wall 22 and from the flange wall 30. The third 46 and fourth 48 retaining walls are disposed on opposite sides of each of the first 32 and second 34 retaining walls and are generally orthogonal relative to the first 32 and second 34 retaining walls. The third 46 and fourth 48 retaining walls are spaced apart to locate and retain the nut 40 therebetween along a second axis 44, which is generally orthogonal to the first axis 42. Thus, the retaining walls 32, 34, 46, 48 form an open-ended box section for locating and retaining the nut 40 relative to the bin 20 along two axes 42, 44. The flange wall 30 forms the closed-end of the box section.

The bracket 50 is disposed adjacent to the second retaining wall 34. The second retaining wall 34 is disposed between the nut 40 and the bracket 50. Corresponding holes 36 and 52 are formed in the second retaining wall 34 and the bracket 50, respectively, to receive a threaded fastener 60.

In assembly, the nut 40 may be assembled to bin 20 by inserting the nut 40 into the box section formed between the retaining walls 32, 34, 46, 48. The first 32 and second 34 retaining walls may be spaced apart by a distance slightly smaller than the height of the nut 40, so that the nut 40 is compressed and, thereby, held therebetween. By this arrangement, the nut 40 and the bin 20 may be pre-assembled and delivered as a component for subsequent final assembly with the bracket 50.

A threaded hole 38 in the nut 40 is aligned with the hole 36 in the second retaining wall 36. The bracket 50 is positioned adjacent to the second retaining wall 34. The holes 36, 52 in the second retaining wall 34 and bracket 50 are generally axially aligned. The threaded fastener 60 is inserted through the holes 36, 52 and threaded through the nut 40. The second retaining wall 34 and the bracket 50 are clamped between the nut 40 and the head of the fastener 60, thereby fixedly securing the bin 20 to the bracket 50 to form the bin assembly 10. This eliminates the need to use fasteners that extend through holes formed in the end wall, as is typically found in conventional designs. In conventional designs, covers in the form of carpet, mats or plugs are used to cover holes in the end wall. Thus, eliminating the holes in the wall obviates any need for such covers and, therefore, improves over such conventional designs in terms of manufacturing costs and appearance.

In the illustrated embodiment, the first retaining wall 32 is shorter than the second retaining wall 40 so as to not interfere with the fastener 60 extending through the second retaining wall 34 and bracket 50 and still remain long enough to cooperate with the second retaining wall 34 to hold and retain the nut 40. This eliminates a need to form a hole in the first retaining wall 32 to accommodate the threaded fastener 60 and, therefore, minimizes the complexity and associated cost of the tooling for forming the bin 20.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A bin assembly for use in an interior passenger compartment of a motor vehicle, said bin assembly comprising:
    a bracket for fixedly securing the bin assembly to the motor vehicle, the bracket having a hole extending therethrough;
    a bin having an end wall with opposite first and second sides, the bin having a side wall extending outwardly from the first side of the end wall to form a storage space, a flange wall extending outwardly from the second side of the end wall, a first retaining wall extending from the flange wall, a second retaining wall extending from the flange wall and having a hole aligned with the hole in the bracket to receive a fastener therethrough, the first and second retaining walls being generally parallel and spaced apart to retain a nut therebetween along a first axis, the nut being presented for threading onto the fastener as it is inserted through the holes in the bracket and the second retaining wall of the bin.

2. A bin assembly as set forth in claim 1, wherein the first and second retaining walls extend generally orthogonally from the flange wall.

3. A bin assembly as set forth in claim 2, wherein the flange wall extends generally orthogonally from the second side of the end wall.

4. A bin assembly as set forth in claim 3, wherein the bin includes a pair of flange walls that extend from the second side of the end wall, each pair of flange walls having a set of first and second retaining walls extending outwardly therefrom.

5. A bin assembly as set forth in claim 4, wherein the sets of first and second retaining walls extend in substantially opposite directions from the respective flange walls.

6. A bin assembly as set forth in claim 5, wherein the sets of first and second retaining walls are generally symmetrically opposite about a center line of the bin.

7. A bin assembly as set forth in claim 1, wherein the distance between the first and second retaining walls is less than the height of the nut.

8. A bin assembly as set forth in claim 1, wherein the first retaining wall is shorter than the second retaining wall relative to the flange wall.

9. A bin assembly as set forth in claim 1 including third and fourth retaining walls extending outwardly from the second side of the bin for locating and retaining the nut along a second axis that is generally orthogonal to the first axis.

10. A bin assembly as set forth in claim 9, wherein the third and fourth retaining walls are disposed on opposite sides of the first and second retaining walls to form a box section that is open-ended to receive the nut therein, the box section locating the nut relative to the bin along the first and second axes.

11. A bin assembly as set forth in claim 10, wherein the first and second retaining walls extend generally orthogonally from the flange wall.

12. A bin assembly as set forth in claim 11, wherein the second and third retaining walls extend generally orthogonally from the flange wall.

13. A bin assembly as set forth in claim 12, wherein the second and third retaining walls are longer than the first and second retaining walls relative to the flange wall.

14. A bin assembly as set forth in claim 13, wherein the first retaining wall is shorter than the second retaining wall relative to the flange wall.

* * * * *